US012655612B2

(12) United States Patent
Kim

(10) Patent No.: US 12,655,612 B2
(45) Date of Patent: Jun. 16, 2026

(54) BLIND SPOT DISPLAY DEVICE FOR CONSTRUCTION EQUIPMENT

(71) Applicant: HD HYUNDAI CONSTRUCTION EQUIPMENT CO., LTD., Gyeonggi-do (KR)

(72) Inventor: Yong Ho Kim, Gyeonggi-do (KR)

(73) Assignee: HD HYUNDAI CONSTRUCTION EQUIPMENT CO., LTD., Gyeonggi-do (KR)

( * ) Notice: Subject to any disclaimer, the term of this patent is extended or adjusted under 35 U.S.C. 154(b) by 0 days.

(21) Appl. No.: 18/881,310

(22) PCT Filed: Jul. 5, 2023

(86) PCT No.: PCT/KR2023/009528
§ 371 (c)(1),
(2) Date: Jan. 6, 2025

(87) PCT Pub. No.: WO2024/010375
PCT Pub. Date: Jan. 11, 2024

(65) Prior Publication Data
US 2026/0009206 A1 Jan. 8, 2026

(30) Foreign Application Priority Data

Jul. 5, 2022 (KR) ........................ 10-2022-0082739

(51) Int. Cl.
B60R 1/27 (2022.01)
E02F 9/24 (2006.01)
(Continued)

(52) U.S. Cl.
CPC .................. E02F 9/26 (2013.01); B60R 1/27 (2022.01); E02F 9/24 (2013.01); G06F 3/013 (2013.01);
(Continued)

(58) Field of Classification Search
CPC ............................................. B60R 2001/1215
See application file for complete search history.

(56) References Cited

U.S. PATENT DOCUMENTS

| | | | | |
|---|---|---|---|---|
| 10,993,612 | B1* | 5/2021 | Abou Shousha | ...... A61B 3/113 |
| 2010/0253541 | A1* | 10/2010 | Seder | ................... G08G 1/0962 |
| | | | | 340/905 |
| 2013/0155240 | A1* | 6/2013 | Mitsuta | ................... H04N 7/181 |
| | | | | 348/148 |
| 2013/0222594 | A1* | 8/2013 | Kiyota | ...................... G06T 3/12 |
| | | | | 348/148 |

(Continued)

FOREIGN PATENT DOCUMENTS

| | | |
|---|---|---|
| JP | H06-019546 A | 1/1994 |
| JP | H10-206789 A | 8/1998 |

(Continued)

OTHER PUBLICATIONS

International Search Report for the International Application No. PCT/KR2023/009528 issued by the International Searching Authority (Korean Intellectual Property Office) on Oct. 12, 2023.

(Continued)

*Primary Examiner* — Nan-Ying Yang
(74) *Attorney, Agent, or Firm* — IP & T GROUP LLP

(57) ABSTRACT
The present invention relates to a blind spot display device for construction equipment including a detector provided in the construction equipment to detect an object around the construction equipment; a display provided in front of eyes of a driver of the construction equipment; a gaze tracker tracking a direction of a gaze of the driver; and a controller acquiring information from the detector and the gaze tracker and analyzing information on a direction consistent with the gaze of the driver, wherein the controller displays a marker for the object included in the direction of the gaze of the driver on the display.

8 Claims, 6 Drawing Sheets

(51) Int. Cl.

| | |
|---|---|
| *E02F 9/26* | (2006.01) |
| *G06F 3/01* | (2006.01) |
| *G06T 11/00* | (2006.01) |
| *G06V 20/58* | (2022.01) |
| *G06V 20/59* | (2022.01) |

(52) U.S. Cl.

CPC .............. *G06T 11/00* (2013.01); *G06V 20/58* (2022.01); *G06V 20/597* (2022.01); *B60R 2300/202* (2013.01); *B60R 2300/308* (2013.01); *B60R 2300/802* (2013.01); *B60R 2300/8093* (2013.01); *G06T 2200/24* (2013.01)

(56) References Cited

U.S. PATENT DOCUMENTS

| | | | |
|---|---|---|---|
| 2015/0199847 | A1 | 7/2015 | Johnson et al. |
| 2016/0004305 | A1* | 1/2016 | Pagliani ............... G06T 19/006 |
| | | | 345/633 |
| 2016/0193920 | A1* | 7/2016 | Tsubone ................. B60K 35/53 |
| | | | 701/36 |
| 2020/0013225 | A1 | 1/2020 | Park et al. |

FOREIGN PATENT DOCUMENTS

| | | | |
|---|---|---|---|
| JP | H11-271666 | A | 10/1999 |
| JP | H11-299032 | A | 10/1999 |
| JP | 2008-143701 | A | 6/2008 |
| JP | 2010-184534 | A | 8/2010 |
| JP | 2012-127059 | A | 7/2012 |
| JP | 2013-030959 | A | 2/2013 |
| JP | 2015-195457 | A | 11/2015 |
| JP | 2016-014768 | A | 1/2016 |
| JP | 2018-123646 | A | 8/2018 |
| JP | 2020-135337 | A | 8/2020 |
| JP | 2020-160777 | A | 10/2020 |
| JP | 2021-157217 | A | 10/2021 |
| KR | 10-2013-0069912 | A | 6/2013 |
| KR | 10-2017-0040349 | A | 4/2017 |
| KR | 10-2017-0071901 | A | 6/2017 |
| KR | 10-1815268 | B1 | 1/2018 |
| KR | 10-2018-0123646 | A | 11/2018 |
| KR | 10-1941904 | B1 | 1/2019 |
| KR | 10-2007535 | B1 | 8/2019 |
| KR | 10-2019-0103079 | A | 9/2019 |
| KR | 10-2332616 | B1 | 12/2021 |

OTHER PUBLICATIONS

Office Action for Japanese Patent Application No. 2025-500404 issued by the Japanese Patent Office on Dec. 9, 2025.
Extended European Search Report for European Patent Application No. 23835841.0 issued by the European Patent Office on May 15, 2026.

* cited by examiner

11

11

11

BLIND SPOT DISPLAY DEVICE FOR CONSTRUCTION EQUIPMENT

This application is a national stage application of PCT/KR2023/009528 filed on Jul. 5, 2023, which claims priority of Korean patent application number 10-2022-0082739 filed on Jul. 5, 2022. The disclosure of each of the foregoing applications is incorporated herein by reference in its entirety.

TECHNICAL FIELD

The present invention relates to a blind spot display device for construction equipment.

BACKGROUND ART

In general, various types of construction equipment such as cranes, dump trucks, bulldozers, excavators, and forklifts are widely used in construction sites, civil engineering sites, and various industrial sites.

Since most construction equipment has a large, heavy body and generates enormous power, a driver who drives construction equipment pays careful attention to prevent accidents, and there has always been a risk of causing big accidents due to momentary mistakes.

Construction equipment is generally driven by a single driver, and it is impossible for the driver of the construction equipment to visually recognize all the situations around the construction equipment, and even when wireless communication is made with other workers in the vicinity, there is still a risk of accidents while working around the construction equipment.

In particular, construction equipment such as excavators and forklifts have relatively wide windows in the driver's room, which makes it easy for the driver to observe the front, but the equipment loaded on the vehicle body makes it difficult for them to observe left and right and rear.

Therefore, the driver normally operate the construction equipment by monitoring the surroundings of the construction equipment through various mirrors such as rear view mirrors located inside the construction equipment or side view mirrors located on the left and right sides, but there is a blind spot in the range where the driver may monitor the construction equipment with the naked eye from the driver's seat.

Such blind spots are a major problem in terms of safe operations of construction equipment, and in fact, accidents such as human casualties or damage to structures which occur during the operation of construction equipment mostly occur at left and right and rear blind spots which are difficult for the driver to observe, so both construction equipment drivers and surrounding workers need to be careful at the site.

Despite such caution, accidents caused by construction equipment frequently occur during work due to the carelessness of the driver or the surrounding workers. Such accidents are mainly caused by the driver who failed to recognize the surrounding workers who were working in the rear or the blind spot of the construction equipment while driving the construction equipment, and in the case of excavators, hit the surrounding workers by rotating the boom or injured them in the process of moving the construction equipment backward.

In order to solve this problem, a peripheral recognition system using various sensors and cameras is currently being developed, and among them, as disclosed in Korean Patent No. 10-2007535, an Around View Monitoring (AVM) system which displays the surroundings of construction machinery through cameras installed in the front, back, left, and right directions of the construction machinery is applied so that the driver may recognize blind spots. However, the AVM screen is displayed on the monitor provided in the construction machinery, so the driver has to turn the gaze to the monitor during work, the driver's gaze deviates from the work site, and the driver is unable to respond immediately.

DISCLOSURE

Technical Problem

The present invention has been invented to solve the above-described problems of the prior art, and an object the present invention is to provide a blind spot display device for construction equipment which improves work efficiency and prevents safety accidents by providing information on a blind spot to a construction equipment driver through a smart glass to allow the driver to be less affected by the external environment and reduce the movement of the driver's gaze during work.

Technical Solution

According to one aspect of the present invention, a blind spot display device for construction equipment may include a detector provided in the construction equipment to detect an object around the construction equipment, a display provided in front of eyes of a driver of the construction equipment, a gaze tracker tracking a direction of a gaze of the driver, a controller acquiring information from the detector and the gaze tracker and analyzing information on a direction consistent with the gaze of the driver, wherein the controller displays a marker for the object included in the direction of the gaze of the driver on the display.

Specifically, the ink fixer composition for tattoo printing may include a binder in an amount of 3% to 15% by weight based on the total weight of the ink fixer composition. Specifically, the controller may display a marker for the object included in the direction of the gaze and present in a blind spot in the direction of the gaze of the driver on the display so that the driver recognizes the object in the blind spot.

Specifically, the controller may further include a pupil sensor recognizing pupils in the eyes of the driver, an angle sensor recognizing an angel change of the display, wherein the controller modifies a display position of the marker on the display in response to the angle change by analyzing information from the pupil sensor, the gaze tracker, and the angle sensor.

Specifically, the controller may further include an alarm unit providing an alarm for the object, wherein the controller operates the alarm unit to allow the driver to recognize the object when the object is located within a working radius of the construction equipment.

Specifically, the detector may include at least one of a camera, radar, LiDAR, or an ultrasonic sensor, and wherein the detector is provided on front, rear, left, and right sides of the construction equipment and is also provided in front of a configuration of the construction equipment causing the blind spot.

Specifically, the display may provide the driver with an interface for setting and correcting a function of the controller.

When the construction equipment is an excavator, the blind spot may be formed by a boom structure of the excavator, and the working radius may be set based on a length of the boom structure.

Specifically, the marker may include contours of the object, a box shape including the object, or an image in which the object is projected onto the blind spot.

Specifically, the controller may provide an alarm through the alarm unit when movements of the eyes through the pupil sensor or the gaze tracker are less than or equal to a set value, and the display may be provided in smart glasses.

Advantageous Effects

A blind spot display device for construction equipment according to the present invention improves work efficiency and prevents safety accidents by providing a driver of construction equipment with blind spot information through a smart glass to allow the driver to be less affected by the external environment and reduce the movements of the driver's gaze during work.

The effects of the present invention are not limited to the above-mentioned effects, and other effects that are not mentioned can be clearly understood by those skilled in the art from the description of the claims.

MODES OF THE INVENTION

Figure 1:
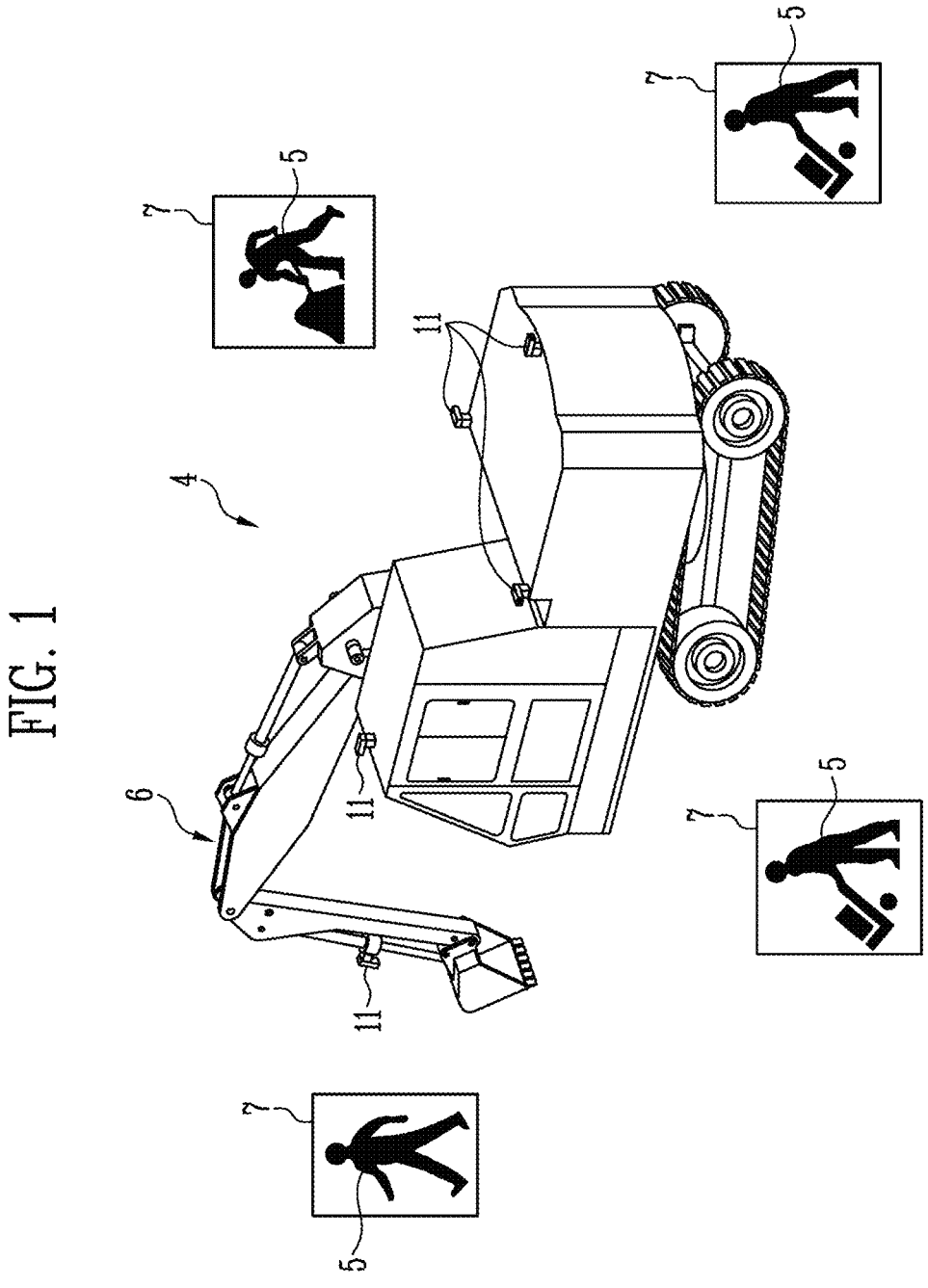
FIG. 1 is a conceptual diagram of construction equipment according to an embodiment of the present invention.

Objects, particular advantages, and novel features of the invention will become more apparent from the following detailed description and the preferred embodiments in connection with the appended drawings. It should be noted that, in the specification, reference numerals are added to the components in each drawing, so that the same components have the same numerals as much as possible, even when they are shown in other drawings. In addition, in describing the present invention, if it is determined that any specific description of the related known art may unnecessarily obscure the gist of the present invention, a detailed description thereof will be omitted.

Hereinafter, preferred embodiments of the present invention will be described in detail with reference to the accompanying drawings.

Figure 2:
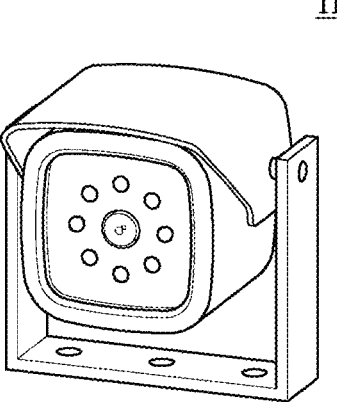
FIG. 2 is a perspective view of a detector according to a first embodiment of the present invention.
Figure 3:
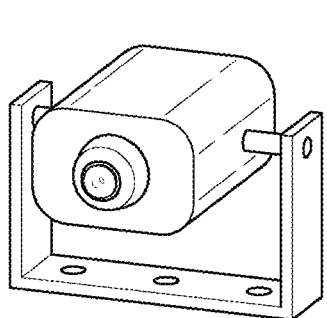
FIG. 3 is a perspective view of a detector according to a second embodiment of the present invention.
Figure 4:
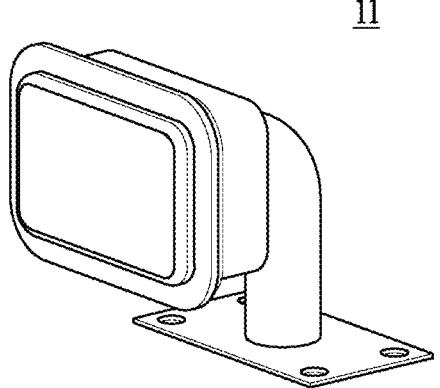
FIG. 4 is a perspective view of a detector according to a third embodiment of the present invention.

FIG. 1 is a conceptual diagram of construction equipment according to an embodiment of the present invention. FIG. 2 is a perspective view of a detector according to a first embodiment of the present invention. FIG. 3 is a perspective view of a detector according to a second embodiment of the present invention. In addition, FIG. 4 is a perspective view of a detector according to a third embodiment of the present invention.

Referring to FIG. 1, construction equipment 4 is shown as an excavator, but cranes, dump trucks, bulldozers, forklifts, etc. used in various construction sites may also be included in the construction equipment 4.

A blind spot display device of the construction equipment 4 of the present invention includes a detector 11, a display 12, a pupil sensor 21, a gaze tracker 22, an angle sensor 23, an alarm unit 24, and a controller 31 provided in the construction equipment 4.

A plurality of detectors as the detector 11 may be provided in the construction equipment 4, and may be provided in front, rear, left, and right sides of the construction equipment 4.

Referring to FIG. 1, the detector 11 is provided on the front, rear, left, and right sides of the construction equipment 4, and may also be provided in front of the configuration of the construction equipment 4 which causes blind spots in the driver's gaze.

In the case where the construction equipment 4 is an excavator, the blind spot of the driver's gaze may be formed by the boom structure of the excavator. In the case where the construction equipment 4 is a forklift, the blind spot may be formed by a mast or a fork.

Referring to FIG. 1, an excavator is shown as construction equipment 4, and the blind spot is formed by a boom structure 6, which causes the driver's blind spot. As a result, the driver may not be able to recognize an object 5 (including people) in the area covered by the boom structure 6.

Therefore, the object 5 on the front and side of the boom structure 6 is located in the blind spot of the driver's gaze and cannot be visually recognized by the driver. The blind spot display device of the construction equipment 4 of the present invention provides the detector 11 in front of the boom structure 6 to detect the object 5 in the blind spot of the driver's gaze, thereby preventing safety accidents.

The detector 11 capable of detecting the object 5 around the construction equipment 4 may include at least one of a camera, radar, LiDAR, and an ultrasonic sensor.

A plurality of cameras which are commonly used equipment for monitoring the surroundings of construction equipment 4 may be provided. The plurality of cameras may be able to recognize the object 5 from images using IMOD, which is an image-based detection system, rather than simply taking images and delivering the images to the controller 31. In addition, it may be possible to recognize objects in images through AI.

Referring to FIGS. 2 and 3, a camera, which is an embodiment of the detector 11, is displayed. The camera includes a lens and may also have a fastening plate which is arranged on the construction equipment 4 by means of screws or welding.

Referring to FIG. 2, the camera may be provided with an LED along with the lens, so that the object 5 may be identified even when the surrounding environment is dark. In addition, a camera cover may also be provided to prevent light smearing or failure to recognize the object 5 when another light such as direct sunlight is irradiated on the lens.

In addition, the side of the camera is provided with a pivot structure which allows a vertical angle of the camera to be adjusted to recognize the object 5. The fixing plate which fixes the camera is connected to the construction equipment 4 through the pivot structure, whereby it is possible to adjust a horizontal angle of the camera, so that any object 5 may not deviate from the viewing angle of the camera.

Referring to FIG. 3, the camera may be provided with a lens which protrudes more and has a larger diameter than that of FIG. 2. Since the performance of the camera may be improved in proportion to the size of the lens, high-definition images may be captured to thereby improve resolution. As a result, the recognition of the object 5 may be improved.

In addition, the side surface of the camera and the fixing plate which fixes the camera are provided in a pivot structure, so that the vertical and horizontal angles of the camera may be adjusted so as not to allow any object 5 to deviate from the viewing angle of the camera. In addition, the camera may be provided so that viewing angles of the plurality of cameras overlap each other.

A plurality of cameras provided in the construction equipment 4 may have the same performance, and different lenses may be used depending on locations thereof. Cameras with different performances may be arranged.

VGA-class analog cameras may be used for the image quality of the camera, and a clearer HD-class digital camera may be used to take high-resolution images and improve the recognition of the object 5 the images using IMOD.

Radar is a device which detects an object and measures a distance using radio waves. The radar may detect the object 5 and determine the direction, distance, speed, etc. by irradiating radio waves and measuring reflected waves which return after the irradiated radio waves hit the object.

Therefore, when the distance between the construction equipment 4 and the object 5 changes due to the movement of the construction equipment 4 or the movement of the surrounding object 5, the time it takes for the radio waves irradiated by the radar to bounce back is changed and it is possible to know whether there is a collision with the construction equipment 4, which may be transmitted to the controller 31.

A plurality of radars may be provided on the construction equipment 4 and may be used alone. However, the radars may be used together with cameras to reduce safety accidents and ensure accuracy in recognizing the object 5 since there may be errors in the detection range if the radars are used alone.

Referring to FIG. 4, the radar is shown. The radar may be partially fixed to the construction equipment 4 and concentrated on the rear of the construction equipment 4 which does not reach the driver's field of view.

The radar may have a body attached to the construction equipment 4 or may be spaced apart from the main body equipment. A connection portion of the radar and the construction equipment 4 may be provided with a pivot structure to adjust the horizontal angle.

LiDAR is different equipment from radar, and it is a sensor which emits laser around the area, measures the time of flight of the reflected laser after hitting an object, and creates maps of surrounding environment to help the construction equipment 4 determine its location on its own.

The LiDAR is equipped with a laser in a cylindrical cover, so that the laser rotates 360 degrees, emits laser light, and receives the reflected laser to create a surrounding map, which may be a spinning or rotation method.

However, this method may have issues of failures and consistency because the motor is included, so a method in which the laser is fixed and then heat is applied to change the refractive index to emit laser light by radar, or a method in which a phase is changed using a mirror or a liquid crystal may also be used.

Ultrasound sensors use ultrasonic waves which are audio frequencies outside the range of human hearing. The distance to the object 5 may be measured by measuring the time it takes for the emitted ultrasonic waves to hit the object 5 and bounce back. Radar and ultrasonic waves have similar measurement principles, but there is a difference in which the radar uses electromagnetic waves and the ultrasonic waves use sound waves. Since ultrasonic sensors have a long life and are inexpensive, a plurality of ultrasonic sensors may be provided in the construction equipment 4.

The display 12 may be provided in front of the eyes of the driver of the construction equipment 4, and a support (not shown) which supports the display 12 may have various shapes as long as it moves in line with the movements of the driver's head. For example, the support may be in the form of glasses or may be attached to a helmet.

Therefore, the existing monitor and HUD are fixed at a specific point to display information, whereas the display 12 is provided in front of the driver's eyes and may move in line with the forward, backward, and lateral (left-right direction) movements of the driver's head, so that the position of the display 12 may be changed.

The display 12 may provide an interface for setting a function of the controller 31 to be described below or for correcting such as numerical adjustment, so that even the same information may be displayed in different forms on the display 12 depending on the interface adjustment.

The display 12 not only displays the information of the controller 31 to the driver, but also enables the driver to work through the display 12 since the display 12 may include a transparent material such as glass. Therefore, when the display 12 does not provide information, the driver may see the same real world regardless of the presence or absence of the display 12.

A marker 7 to be described below may include an augmented reality-overlay (AR) concept in which the marker 7 is superimposed on the real world viewed by the driver through the display 12 and displayed on the display 12.

The pupil sensor 21 is configured to recognize the pupil from the driver's eyes, and may recognize the pupil by irradiating infrared rays. The pupil sensor 21 may be provided around the display 12, and a plurality of pupil sensors may be provided to recognize left and right pupils, respectively.

The gaze tracker 22 is equipment which tracks the direction of the driver's gaze with respect to information such as the marker 7 displayed on the display 12, and may obtain information on the driver's gaze as in the pupil sensor 21. Therefore, even when the position of the display 12 does not change, different information may be displayed on the display 12 depending on the direction of the driver's gaze, and even the same information may be displayed at different positions.

The movements of the driver's eyes may be grasped through the pupil sensor 21 and the gaze tracker 22. When the eyes' movements are less than or equal to a set value, a signal may be provided to the controller 31 and an alarm may be provided to the driver through the controller 31.

When the eyes' movements are less than the set value, it may include cases where pupil recognition is not possible. Thus, when the driver is unable to concentrate on the work or falls into drowsiness, the controller 31 alerts the driver by an alarm, thereby preventing safety accidents. This function may operate even while the driver is resting, so an on-off function may be added.

The angle sensor 23 may recognize an angle change of the display 12. Since the display 12 is provided in front of the driver's eyes, the angle change of the display 12 and the angle change of the driver's head may be the same.

As the angle sensor 23, a sensor which recognizes the inclination of the display 12 may be used. Since the angles of the top, bottom, left, and right need to be recognized, at least two sensors which recognize angles in vertical and horizontal directions may be provided, and a plurality of sensors may be provided for accuracy.

Therefore, the angle sensor 23 may recognize a case where the driver moves the head up, down, left, and right during work, and the angle sensor 23 may transmit information on the angle change to the controller 31 to modify the display position of the information displayed on the display 12 by the controller 31.

The angle sensor 23 may recognize a case in which the driver moves the head up, down, left, and right while looking forward, and a case in which the driver moves the head while looking sideways and backward. Therefore, even when the driver does not use a side mirror (not shown) or a room mirror (not marked) provided in the construction equipment 4, the driver may notice the object 5 located on the side and rear of the construction equipment 4 by the blind spot display device of the construction equipment 4 of the present invention.

The alarm unit 24 provides an alarm for the object 5 around the construction equipment 4. An alarm may be provided when the object 5 is located within the working radius of the construction equipment 4 and may be controlled through the controller 31.

The alarm may be provided with vibration or sound, and the magnitude of the vibration or sound and the on/off function may be changed by the controller 31.

The working radius of the construction equipment 4 may vary depending on the construction equipment 4. However, in the case of an excavator, the boom structure 6 is provided, and the boom structure 6 includes a boom and arm, which enables to change the height and length during work. The working radius of the excavator may therefore be set on the basis of the length of the boom structure 6.

In addition, the alarm unit 24 may receive a signal from the controller 31 and provide an alarm to the driver when the movements of the eyes are less than or equal to the set value, and the driver may be alerted by an alarm because the movements of the eyes are less than the set value may be when the driver is drowsy or unable to concentrate on work.

The controller 31 may collect and analyze information on the blind spot display device of the construction equipment 4 of the present invention.

The controller 31 may obtain information from the detector 11 which detects the object 5 around the construction equipment 4 and the gaze tracker 22 which tracks the direction of the driver's gaze, and may analyze the information in the direction which matches the driver's gaze.

In addition, the controller 31 may receive and analyze information from the pupil sensor 21 which recognizes the driver's pupil and the angle sensor 23, and may display the marker 7 for the object 5 included in the direction of the driver's gaze on the display 12.

The marker 7 displays the object 5 around the construction equipment 4 detected through the detector 11, and is displayed on the display 12 so that the driver may recognize the marker 7 during work. The marker 7 may be displayed in various forms, such as the contours of the object 5, box shapes in various colors including the object 5, and video or images projected to a blind spot when the object 5 exists in the blind spot of the driver's gaze.

Since the display of the marker 7 is modified in the interface provided by the display 12, the display of the marker 7 used by each driver may be different. Since the marker 7 overlaps with the real world viewed by the driver through the display and is displayed on the display 12, the mark 7 may include an AR function which is augmented reality.

In addition, an alarm of the alarm unit 24 is provided when the object 5 is located within the working radius of the construction equipment 4. The marker 7 may be differently displayed depending on whether the object 5 existing in the blind spot is within the working radius. For example, when the object 5 is within the working radius, the marker 7 may be displayed in a red box, and when the object 5 is present outside the working radius, the object 5 may be displayed in a green box.

The controller 31 analyzes information included in the direction of the driver's gaze and displays the information on the display 12. However, there may be blind spots of the driver's gaze in the construction equipment 4.

The construction equipment 4 such as excavators and forklifts have relatively wide windows in the driver's room, making it easy to observe the front, but it is difficult to observe the left, right and rear sides due to the equipment loaded on the vehicle body.

In particular, in the case of excavators, the boom structure 6 is provided in one direction of the construction equipment 4. Thus, the driver is biased toward the opposite side and provided with information of the field of view which the driver sees with the naked eye. Blind spots may vary during work since the boom structure 6 changes during work.

Therefore, the controller 31 may display the object 5, which is included in the direction of the driver's gaze but is in the blind spot, with the marker 7 on the display 12, so that the driver may recognize the object 5 in the blind point.

Equipment which recognizes and displays the object 5 around the conventional construction equipment 4 has a separate monitor and is arranged around the driver. Therefore, the driver had to look at the monitor from time to time while working. The driver's gaze deviates from the work site during the work, which makes it difficult to respond immediately. However, in the blind spot display device of the construction equipment 4 according to the present invention, the display 12 is provided in front of the driver's eyes, and the marker 7 for the surrounding object 5 is displayed on the display 12, so that the driver may recognize the surrounding object 5 while working without changing the gaze.

Figure 5:
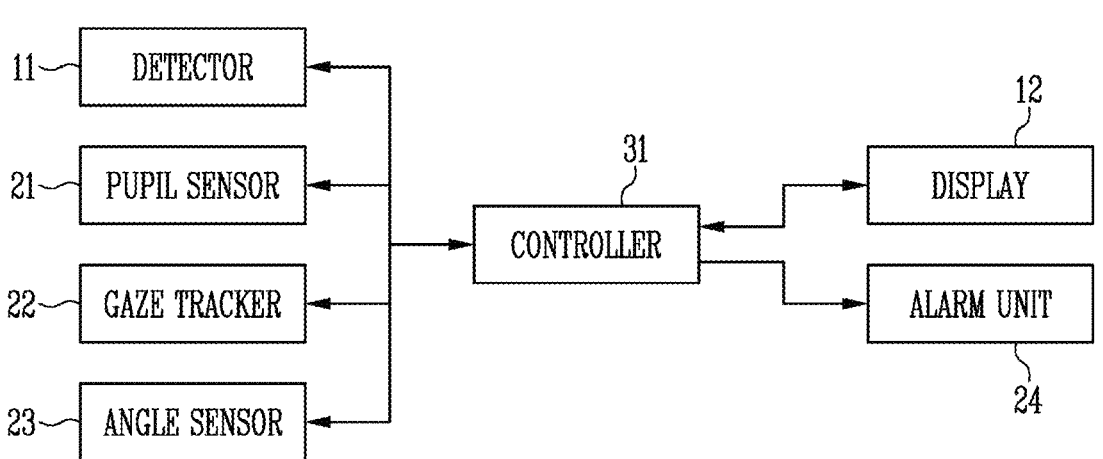
FIG. 5 is a block diagram illustrating a blind spot display device for construction equipment according to an embodiment of the present invention.

FIG. 5 is a block diagram illustrating a blind spot display device for construction equipment according to an embodiment of the present invention.

The controller 31 may acquire information from the detector 11, the pupil sensor 21, the gate tracker 22, and the angle sensor 23 to analyze the acquired information in the direction of the driver's gaze, and display the analyzed information on the display 12. In addition, by sending a signal to the alarm unit 24, the alarm unit 24 provides an alarm to the driver, so that the driver may be alerted by the alarm when the object 5 is located within the working radius of the construction equipment 4 or when the driver is drowsy.

Since the detector 11 is provided in the construction equipment 4, wireless communication may be performed with the controller 31, the pupil sensor 21 and the gate tracker 22 are provided around the driver's eyes, and the angle sensor 23 is provided on the display 12, so that wireless or wired communication may be performed between the pupil sensor 21, the gaze tracker 21, and the angle sensor 23 and the controller 31.

The controller 31 may modify the information on the surrounding object 5 around the construction equipment 4 through the detector 11 to correspond to the driver's visual information and may provide the modified information to the display 12. The controller 31 may receive information in real time from the pupil sensor 21, the gaze tracker 22, and the angle sensor 23.

Since the display 12 is provided with an interface for setting and correcting the functions of the controller 31, the driver may adjust the above-mentioned functions of the controller 31. In particular, the driver may select the display form of the marker 7.

Figure 6:
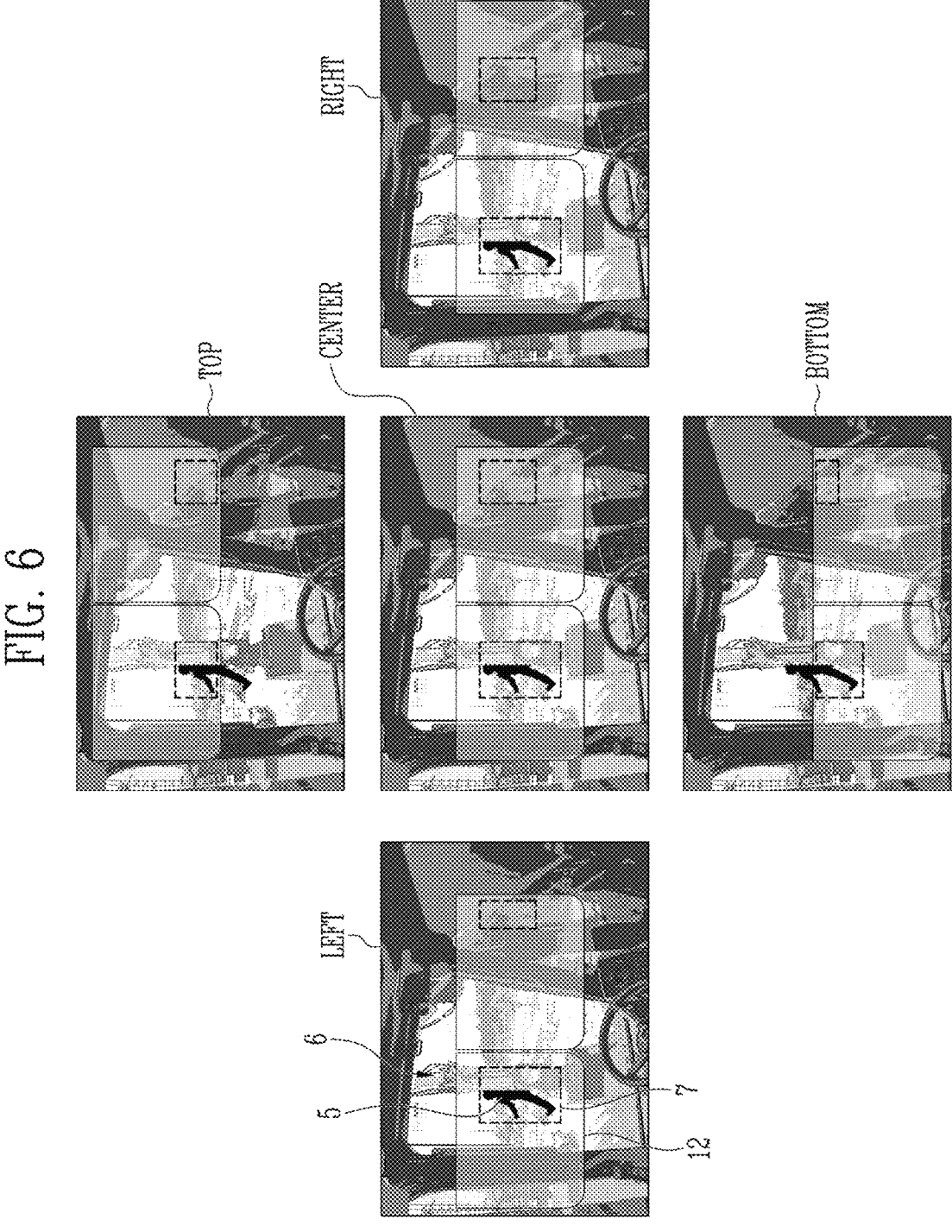
FIG. 6 is a conceptual diagram of a blind spot display device for construction equipment according to an embodiment of the present invention.

FIG. 6 is a conceptual diagram of a blind spot display device for construction equipment according to an embodiment of the present invention.

The display 12 is provided in front of the driver's eyes. The display 12 may be in the form of goggles or glasses depending on the shape and may be provided only in front of one eye.

Referring to FIG. 6, the blind spot display device of the construction equipment 4 according to an embodiment of the present invention is in the form of glasses, which may be smart glasses. Therefore, the display 12 may be provided in the smart glasses, and the driver may recognize the construction site in the real world through the display 12 even when information is not displayed on the display 12.

In FIG. 6, the display 12 is shown as opaque or colored, but this is only an embodiment. The display 12 may be provided as transparent.

Referring to FIG. 6, five images are provided, and words are displayed for each image, with 'center' representing a center image, 'top' representing a top image, 'bottom' representing a bottom image, 'left' representing a left image, and 'right' representing a right image.

FIG. 6 shows the field of view when the driver boards the construction equipment 4 and works while looking forward. The center image shows the case when the driver's field of view is at the center, and the top, bottom, left, and right directions centered on the center image are the cases where the driver turns the field of view vertically and horizontally.

In the case of the center image, it may be seen which a blind spot is formed by the boom structure 6 in the driver's field of view. Since the boom structure 6 is frequently changed during work, the blind spots may also be frequently changed. The box on the display 12 in the center image displays the object 5 around the construction equipment 4 with the marker 7, and the shape of the box may vary depending on the setting of the marker 7.

Referring to the center image, two objects 5 around the construction equipment 4 are detected by the detector 11, and the surrounding object 5 exists in the blind spot caused by the boom structure 6 and it is difficult for the driver to recognize the surrounding object 5 with the naked eye. However, since the controller 31 also provides the marker 7 for the object 5 which exists in the blind spot on the display 12, which allows the driver to recognize the object 5 in the blind spot through the marker 7.

For convenience of understanding, the top, bottom, left, and right images correspond to changes in the driver's gaze and head angle when the construction equipment 4 and the object 5 stand still.

In the top image, the driver's gaze and head angle are upwards, and the marker 7 is located on the lower side of the display 12. The controller 31 may analyze information from the pupil sensor 21, the gaze tracker 22, and the angle sensor 23 and modify the display position of the marker 7 on the display 12 in response to the changes in the angle of the driver.

Therefore, when the driver's gaze and head angle are in the upward direction, the marker 7 for the object 5 located in the center may be relatively located on the lower side of the display 12.

In the top image, it is possible to compare states before and after wearing the blind spot display device of the construction equipment 4 according to the present invention. In the construction site before the blind spot display device is worn, the object 5 is located in the blind spot, and it is difficult to recognize the object 5 with the naked eye. Thus, the driver of the construction equipment 4 may work without recognizing the object 5, which could lead to safety accidents.

After the blind spot display device is worn, the object 5 is displayed with the marker 7 on the display 12 so that the driver may intuitively recognize the object 5. In addition, since the object 5 is recognized through the display 12 provided in front of the driver's eyes without using a different monitor for recognizing the object 5, it is possible to reduce the changes of the driver's gaze at the work site.

In the bottom image, the driver's gaze and head angle are downward, and the marker 7 is located on the upper side of the display 12. When compared with the top image, the size of the marker 7 may be different. The size of the marker 7 displayed on the display 12 may vary depending on the direction of the driver's gaze according to the driver's head angle.

In the left image, the driver's gaze and head angle are in the left direction, and the marker 7 is located on the right side of the display 12. Even when the driver changes the gaze and the head to the left, the marker 7 is displayed in a relatively small form on the right side of the display 12, so that the driver may recognize the object 5.

In the right image, the driver's gaze and head angle are in the right direction, and the marker 7 is relatively on the left side as compared to the center image on the display 12. However, the object 5 in the blind spot is displayed with the marker 7, so that the driver may recognize the object 5.

In the case of FIG. 6, the driver turns the head up, down, left, and right during working while looking forward in the construction equipment 4, and the same may apply when the driver looks sideways and rearward.

The controller 31 may display the marker 7 for the object 5 included in the direction of the driver's gaze on the display 12. The direction of the driver's gaze may be forward, lateral, and backward. The driver may recognize the object 5 located in the blind spot of the driver's gaze through the blind spot display device of the construction equipment 4 of the present invention.

The blind spot of the driver's gaze may also be formed by a cabin (not shown) where the driver boards in the boom structure and the construction equipment 4 of the excavator. In general, the driver may recognize the object 5 located on the side or rear of the cabin through the side mirrors or the room mirror provided in the construction equipment 4. However, the driver has to move the gaze from the work site, and may fail to recognize the object 5 during the work, and the field of view which may be seen through the side mirrors or the room mirror is limited.

The blind spot display device of the construction equipment 4 of the present invention may overcome these disadvantages. Since the object 5 in all directions of the driver's gaze including the blind spot of the driver's gaze is recognized and displayed with the marker 7, the driver may recognize the object 5 located not only in front but also in the side and rear of the construction equipment 4.

Therefore, the driver does not need to turn the eyes to a separate monitor, etc. to recognize the surrounding object 5, so that the driver may focus on the work to thereby improve work efficiency. In addition, the driver may immediately respond to the object 5 in unexpected positions, so that the blind spot display device of the construction equipment 4 of the present invention may prevent safety accidents by minimizing the movements of the driver's eyes.

The present invention is not limited to the embodiments described above, and may include a combination of the above embodiments or a combination of at least one of the above embodiments and a known technology as another embodiment.

Although the present invention has been described above in detail with reference to specific embodiments, it is intended to specifically describe the present invention, and the present invention is not limited thereto, and it will be apparent which modification or improvement thereof is possible by a person having ordinary skill in the art within the technical idea of the present invention.

All simple modifications and variations of the present invention fall within the scope of the present invention, and the specific scope of protection of the present invention will be clarified by the appended claims.

The present invention is not limited to the above-described embodiments, and it is obvious that a combination of the embodiments or a combination of at least one of the embodiments and a known technology may be included as another embodiment.

Although the present invention has been described in detail through specific embodiments, this is intended to specifically explain the present invention, and the present invention is not limited thereto, and it will be apparent that modifications or improvements can be made by those skilled in the art within the technical spirit of the present invention.

All simple modifications or changes of the present invention fall within the scope of the present invention, and the specific protection scope of the present invention will be made clear by the appended claims.

The invention claimed is:

1. A blind spot display device for construction equipment, comprising:
    a detector provided in the construction equipment to detect an object around the construction equipment;
    a display provided in front of eyes of a driver of the construction equipment;
    a gaze tracker tracking a direction of a gaze of the driver;
    a controller acquiring information from the detector and the gaze tracker and analyzing information on a direction consistent with the gaze of the driver; and
    an alarm unit providing an alarm for the object, wherein the controller displays a marker for the object included in the direction of the gaze of the driver on the display,
wherein the controller operates the alarm unit to allow the driver to recognize the object when the object is located within a working radius of the construction equipment,
wherein when the construction equipment is an excavator, the blind spot is formed by a boom structure of the excavator, and
the working radius is set based on a length of the boom structure.

2. The blind spot display device for construction equipment of claim 1, wherein the controller displays a marker for the object included in the direction of the gaze and present in a blind spot in the direction of the gaze of the driver on the display so that the driver recognizes the object in the blind spot.

3. The blind spot display device for construction equipment of claim 2, wherein the controller further comprises:
    a pupil sensor recognizing pupils in the eyes of the driver; and
    an angle sensor recognizing an angel change of the display,
    wherein the controller modifies a display position of the marker on the display in response to the angle change by analyzing information from the pupil sensor, the gaze tracker, and the angle sensor.

4. The blind spot display device for construction equipment of claim 3, wherein the detector includes at least one of a camera, radar, LiDAR, or an ultrasonic sensor, and
    wherein the detector is provided on front, rear, left, and right sides of the construction equipment and is also provided in front of a configuration of the construction equipment causing the blind spot.

5. The blind spot display device for construction equipment of claim 4, wherein the display provides the driver with an interface for setting and correcting a function of the controller.

6. The blind spot display device for construction equipment of claim 5, wherein the marker includes contours of the object, a box shape including the object, or an image in which the object is projected onto the blind spot.

7. The blind spot display device for construction equipment of claim 6, wherein the controller provides an alarm through the alarm unit when movements of the eyes through the pupil sensor or the gaze tracker are less than or equal to a set value.

8. The blind spot display device for construction equipment of claim 1, wherein the display is provided in smart glasses.

* * * * *